United States Patent [19]
Kambe et al.

[11] Patent Number: 6,045,769
[45] Date of Patent: *Apr. 4, 2000

[54] PROCESS FOR CARBON PRODUCTION

[75] Inventors: Nobuyuki Kambe, Menlo Park; Xiangxin Bi, San Ramon, both of Calif.

[73] Assignee: NanoGram Corporation, Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/986,878

[22] Filed: Dec. 8, 1997

[51] Int. Cl.$^7$ .................................................. D01F 9/127
[52] U.S. Cl. ..................................... 423/447.3; 423/445 R
[58] Field of Search ..................... 423/447.3; 204/157.41

[56] References Cited

U.S. PATENT DOCUMENTS

| | | | |
|---|---|---|---|
| 4,572,813 | 2/1986 | Arkawa | 264/29.2 |
| 4,749,557 | 6/1988 | Yetter et al. | 423/447.3 |
| 4,816,289 | 3/1989 | Komatsu et al. | 423/447.3 |
| 4,876,078 | 10/1989 | Arakawa et al. | 423/447.3 |
| 5,064,467 | 11/1991 | Domb et al. | 423/651 |
| 5,102,647 | 4/1992 | Yamada et al. | 423/447.3 |
| 5,165,909 | 11/1992 | Tennent et al. | 423/447.3 |
| 5,171,560 | 12/1992 | Tennent | 423/447.3 |
| 5,413,773 | 5/1995 | Tibbetts et al. | 423/447.3 |
| 5,500,200 | 3/1996 | Mandeville et al. | 423/447.3 |
| 5,578,543 | 11/1996 | Tennent et al. | 502/180 |
| 5,589,152 | 12/1996 | Tennent et al. | 423/447.3 |

FOREIGN PATENT DOCUMENTS 0 202 911 B1   3/1990   European Pat. Off. .

OTHER PUBLICATIONS

"Length of Carbon Fibers Grown From Iron Catalyst Particles in Natural Gas" by. G. G. Tibbetts, Journal of Crystal Growth, vol. 73, 1985, pp. 431–438.

"Nanoscale Carbon Blacks Produced by $CO_2$ Laser Pyrolysis" by, Bi et al., J. Mater, Res., vol. 10, No. 11, Nov. 1995, pp. 2875–2884.

"Synthesis of Nanocrystalline Fe–based Particles by $CO_2$ Laser Pyrolysis" by Bi et al., Mat. Res. Soc., Symp., Proc., vol. 286, 1993, pp. 161–167.

"Carbon Coating on Iron Carbide Particles Produced by Laser Pyrolysis", 20th Biennial Conference on Carbon, abstract, by Bi et al., 1991.

J.M. Ting, M. Saqib, and D.J. Burton, "Tem Observation of VGCF Produced by a continuous Process," Extended Abstract, 23rd Biennial Conference on Carbon, Jul. 18–23, 1997, pp. 430–431.

D.L. Ciminelli, Capt., USAF, "Sintered Carbon Vapor Grown Carbon Fiber Composites," Extended Abstract, 23rd Biennial Conference on Carbon, Jul. 18–23 1997, pp. 468–469.

J.M. Ting, R. L. Alig, and K. Lafdi, "Materials Based On Pyrograf–III™ Carbon Fiber," Extended Abstract, 23rd Bienneal Conference on Carbon, Jul. 18–23, 1997, pp. 470–471.

A. Oberlin et al., Carbon International Journal, vol. 14 no month (1976), pp. 133–135.

G.G. Tibbetts, Applied Physics Letters, vol. 42 (8) no month (1983) pp. 665–668.

"Nanocrystalline $\alpha$–Fe, $Fe_3C$, and $Fe_7C_3$ Produced by $CO_2$ Laser Pyrolysis", by Bi et al., J.Mater. Res., vol. 8, No. 7, Jul. 1993, pp. 1666–1674.

*Primary Examiner*—Steven P. Griffin
*Assistant Examiner*—Stuart L. Hendrickson
*Attorney, Agent, or Firm*—Westman, Champlin & Kelly P.A.; Peter S. Dardi

[57] ABSTRACT

A method for the production of elemental carbon fibers and carbon particles uses highly uniform catalyst particles, preferably made by laser pyrolysis. Preferred catalyst particles include elemental iron, iron carbides or iron sulfides, generally with an average particle diameter from about 1000 nm to about 5 nm. Also, preferred catalyst particles have a narrow distribution in particle diameters as well as a cut off in particle size that the diameter distribution does not have a tail toward large diameters.

20 Claims, 3 Drawing Sheets

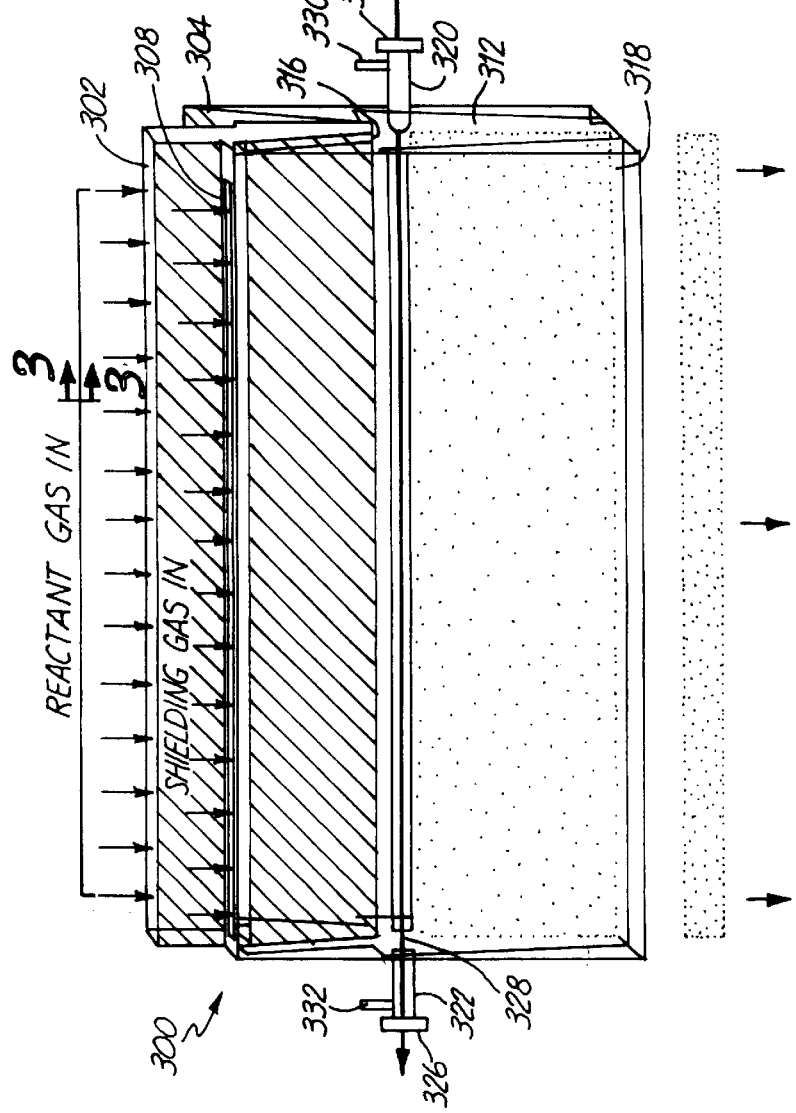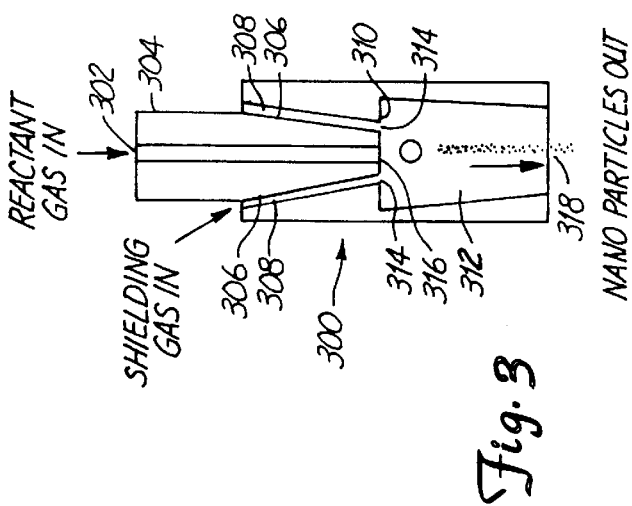
Fig. 2
Fig. 3

PROCESS FOR CARBON PRODUCTION

FIELD OF THE INVENTION

The invention relates to method of producing carbon fibers and carbon particles from a carbon precursor using a catalyst that includes nanoscale particles.

BACKGROUND OF THE INVENTION

There is significant commercial interest in the production of carbon fibers. Graphitic carbon fibrils have high surface area, high Young's modulus of elasticity and high tensile strength. These fibers are used in the production of fiber-reinforced composites. Carbon fiber-reinforced composites are commercially useful because of their notably high strength, stiffness and toughness per unit weight. Because of their superior properties, carbon fiber composites are used in aerospace and sporting goods industries.

The formation of graphitic carbon fibers generally requires temperatures of approximately 2900° C. Suitable temperatures for the formation of graphitic carbon fibers can be lowered through the use of catalysts. Preferred carbon fibers contain little, if any, amorphous, "thermal" carbon. Amorphous carbon associated with fibers can be converted to graphitic form by heating to temperatures between about 2500° C. and about 3000° C.

In addition, nanoscale carbon particles are used for a variety of applications. They are particularly useful for their electrical conductivity. Such conductive particles can be incorporated into a variety of electrical devices such as polymer based electrodes for use in batteries, capacitors and the like.

SUMMARY OF THE INVENTION

Improved catalyst particles for elemental carbon formation can be produced by way of laser pyrolysis. The improved catalyst particles have a high degree of uniformity. In particular, the particles have small average diameters for the production of desirable small diameter carbon particles and fibers. Also, the particles have a narrow distribution of particle diameters around the average diameter. Furthermore, the particles have a cut off in the particle distribution such that there are very few if any particles that have a diameter significantly larger than the average diameter. The improved catalyst particles are contacted with a molecular stream including carbon precursors to generate an improved elemental carbon product.

In a first aspect, the invention features a method of producing elemental carbon including the step of contacting catalyst particles with a carbon precursor gas, the catalyst particles including elemental iron, iron carbide or iron sulfide and having an average diameter from about 5 nm to about 1000 nm with a distribution of diameters such that at least about 95 percent of the particles have a diameter greater than about 60 percent of the average diameter and less than about 140 percent of the average particle diameter. The catalyst particles preferably have an average diameter less than about 500 nm, and more preferably less than about 100 nm.

In certain embodiments, the catalyst particles have substantially no particles with a diameter greater than about 1 micron. The catalyst particles can be produced by laser pyrolysis. To produce elemental carbon, the catalyst particles and carbon precursor gas preferably is heated to a temperature from about 650° C. to about 1300° C. The product elemental carbon can include carbon fibers.

In another aspect, the invention features a method of producing elemental carbon including the step of contacting catalyst particles with a carbon precursor gas, the catalyst particles including elemental iron, iron carbide or iron sulfide and having an average diameter from about 5 nm to about 1000 nm with substantially no particles with a diameter greater than about 1 micron. The catalyst particles preferably have an average diameter less than about 500 nm, and more preferably less than about 100 nm. To produce the elemental carbon, the catalyst particles and carbon precursor gas preferably is heated to a temperature from about 650° C. to about 1300° C. The product elemental carbon can include carbon fibers.

In another aspect, the invention features a method of producing iron sulfide particles including the step of pyrolyzing a molecular stream including an iron precursor compound, a sulfur source and a radiation absorbing gas where the pyrolyzing step is driven by heat absorbed from a laser beam. The iron precursor can include $Fe(CO)_5$, and the sulfur source can include $H_2S$.

Other features and advantages are evident from the detailed description of the invention and claims presented below.

BRIEF DESCRIPTION OF THE DRAWING

FIG. 2 is a schematic, perspective view of a reaction chamber of an alternative embodiment of the laser pyrolysis apparatus, where the materials of the chamber are depicted as transparent to reveal the interior of the apparatus.

FIG. 3 is a sectional view of the reaction chamber of FIG. 2 taken along line 3—3.

DETAILED DESCRIPTION

Figure 1:
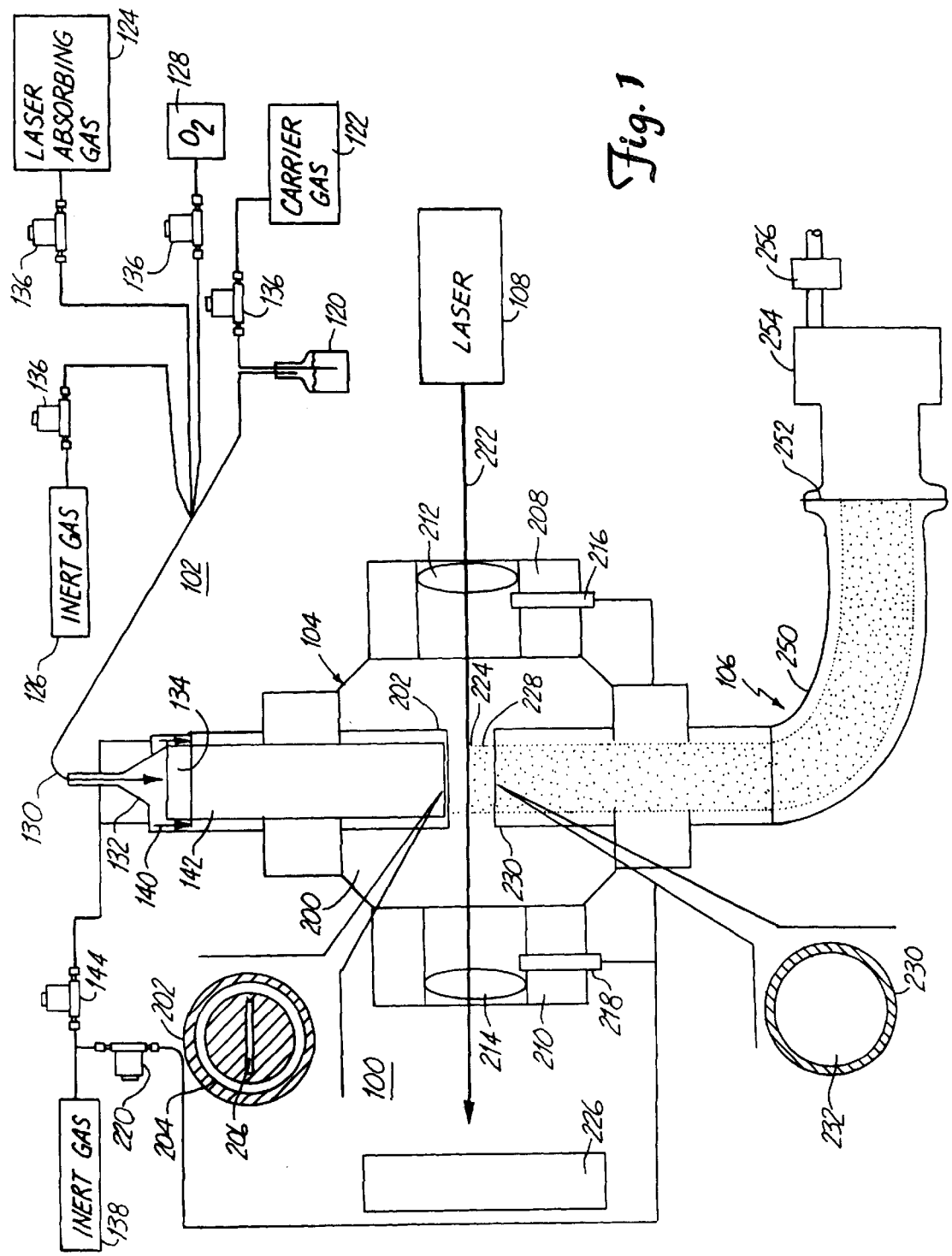
FIG. 1 is a schematic, sectional view of an embodiment of a laser pyrolysis apparatus taken through the middle of the laser radiation path. The upper insert is a bottom view of the injection nozzle, and the lower insert is a top view of the collection nozzle.

Improved catalyst particles have superior properties suitable for carbon formation. In particular, nanoscale iron and iron compound particles useful as catalysts for carbon formation have a very high level of uniformity. The uniformity of preferred particles involves not only a narrow distribution of particle diameters but also uniformity with respect to composition, crystallinity and crystal morphology. Preferred catalyst particles are formed by laser pyrolysis. Preferred particles can include, for example, elemental iron, iron carbides or iron sulfides.

A basic feature of the successful application of laser pyrolysis for the production of nanoscale metal or metal compound particles is the production of a molecular stream containing a metal precursor compound, a radiation absorber and, generally, a second reactant compound. The molecular stream is pyrolyzed by an intense laser beam. The intense heat resulting from the absorption of the laser radiation induces the reaction of the metal precursor compound in the presence of the second reactant compound. The laser pyrolysis forms particles that may be difficult to form under thermodynamic equilibrium conditions. As the molecular stream leaves the laser beam, the metal or metal compound particles are rapidly quenched. The particles then can be subjected to further processing to alter and/or improve the properties of the particles.

In order to form carbon particles, the catalyst particles are contacted with carbon containing gases at elevated temperatures. The temperatures preferably are less than about 1500° C. The catalyst particles catalyze the decomposition of the carbon containing gases and the formation of elemental carbon. Under certain conditions, the catalyst particles become encased in elemental carbon. Alternatively, the catalyst particles catalyze the formation carbon fibers. The carbon fibers preferably are generally cylindrical, and the carbon fibers preferably include concentric layers of ordered carbon atoms.

A. Catalyst Production

Laser pyrolysis has been discovered to be a valuable tool for the production of nanoscale elemental iron, iron carbide and iron sulfide particles of interest. In addition, the nanoscale particles produced by laser pyrolysis are a convenient material for further processing, such as with heat, for the production of desirable iron, iron carbide and iron sulfide particles. Thus, using laser pyrolysis alone or in combination with additional processes, a wide variety of nanoscale particles can be produced.

The reaction conditions determine the qualities of the nanoscale particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Nevertheless, some general observations can be made on the relationship between reaction conditions and the resulting particles.

Increasing the laser power results in increased reaction temperatures in the reaction region as well as a faster quenching rate. A rapid quenching rate tends to favor production of higher energy structures. Similarly, increasing the chamber pressure also tends to favor the production of higher energy structures. Also, increasing the concentration of the reactant serving as a carbon or a sulfur source in the reactant stream favors the production of metal carbides or sulfides with increased amounts of carbon or sulfur.

Reactant gas flow rate and velocity of the reactant gas stream are inversely related to particle size so that increasing the reactant gas flow rate or velocity tends to result in a smaller particle size. Also, the growth dynamics of the particles have a significant influence on the size of the resulting particles. In other words, different crystal forms of a metal compound have a tendency to form particles having a size different from particles having other crystal forms under relatively similar conditions. Laser power also influences particle size, with increased laser power favoring larger particle formation for lower melting materials and smaller particle formation for higher melting materials.

Appropriate iron precursor compounds generally include iron compounds with reasonable vapor pressures, i.e., vapor pressures sufficient to get desired amounts of precursor vapor in the reactant stream. The vessel holding the iron precursor compounds can be heated to increase the vapor pressure of the iron precursor, if desired. Preferred iron precursors include, for example, $Fe(CO)_5$.

Preferred second reactants serving as a carbon source include, for example, $C_2H_4$, $C_6H_6$ and mixtures thereof. Preferred second reactants serving as a sulfur source include, for example, $H_2S$. For the formation of elemental iron particles, the second reactant is not generally necessary. If high purity is desired, however, a second reactant should be used that is effective at forming compounds with the non-iron constituents of the iron precursor. The second reactant compound should not react significantly with the iron precursor compound prior to entering the reaction zone since this generally would result in the formation of large particles.

Laser pyrolysis can be performed with a variety of optical laser frequencies. Preferred lasers operate in the infrared portion of the electromagnetic spectrum. $CO_2$ lasers are particularly preferred sources of laser light. The radiation absorber, such as the infrared absorber, absorbs energy from the radiation beam and distributes the energy as heat to the other reactants to drive the pyrolysis. Infrared absorbers for inclusion in the molecular stream include, for example, $C_2H_4$, $NH_3$, $SF_6$ and $O_3$. $C_2H_4$ can act as both an infrared absorber and as a reactant that can serve as a carbon source. Even though $C_2H_4$ can serve as a carbon source, it is also useful in relatively low concentrations as an infrared absorber and a second reactant for the production of elemental iron.

Preferably, the energy absorbed from the radiation beam increases the temperature at a tremendous rate, many times the rate that energy generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. For the production of iron, iron carbide and iron sulfide particles, appropriate shielding gases include, for example, Ar, He and $N_2$.

The production of alpha iron and iron carbides by laser pyrolysis has been described in Bi et al., "Nanocrystalline $\alpha$-Fe, $Fe_3C$, and $Fe_7C_3$ produced by $CO_2$ laser pyrolysis," J. Mater. Res. 8:1666–1674 (1993), incorporated herein by reference.

An appropriate laser pyrolysis apparatus generally includes a reaction chamber isolated from the ambient environment. A reactant inlet connected to a reactant supply system produces a molecular stream through the reaction chamber. A laser beam path intersects the molecular stream at a reaction zone. The molecular stream continues after the reaction zone to an outlet, where the molecular stream exits the reaction chamber and passes into a collection system. Generally, the laser is located external to the reaction chamber, and the laser beam enters the reaction chamber through an appropriate window.

Referring to FIG. 1, a particular embodiment 100 of a pyrolysis apparatus involves a reactant supply system 102, reaction chamber 104, collection system 106 and laser 108. Reactant supply system 102 includes a source 120 of metal precursor compound. For liquid iron precursors, a carrier gas from carrier gas source 122 can be introduced into precursor source 120, containing liquid precursor to facilitate delivery of the precursor. The carrier gas from source 122 preferably is either an infrared absorber or an inert gas and is preferably bubbled through the liquid, metal precursor compound. The quantity of precursor vapor in the reaction zone is roughly proportional to the flow rate of the carrier gas.

Alternatively, carrier gas can be supplied directly from infrared absorber source 124 or inert gas source 126, as appropriate. The second reactant compound is supplied from source 128, which can be a gas cylinder or other appropriate container. The gases from the metal precursor compound source 120 are mixed with gases from second reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into rectangular channel 134, which forms part of an injection nozzle for directing reactants into the reaction chamber.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass.

Inert gas source 138 is connected to an inert gas duct 140, which flows into annular channel 142. A mass flow controller 144 regulates the flow of inert gas into inert gas duct 140. Inert gas source 126 can also function as the inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas, and a rectangular slit 206 for the passage of reactant gases to form a molecular stream in the reaction chamber. Annular opening 204 can have, for example, a diameter of about 1.5 inches and a width along the radial direction of about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably plane-focusing lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J.

Reactants passing through slit 206 in injection nozzle 202 initiate a molecular stream. The molecular stream passes through reaction zone 224, where reaction involving the metal precursor compound takes place. Heating of the gases in reaction zone 224 is extremely rapid, roughly on the order of $10^{5°}$ C./sec depending on the specific conditions. The reaction is rapidly quenched upon leaving reaction zone 224, and nanoparticles 228 are formed in the molecular stream. The nonequilibrium nature of the process allows for the production of nanoparticles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The chamber pressure generally ranges from about 5 Torr to about 1000 Torr. The preferred chamber pressure for the production of elemental iron, iron carbides and iron sulfides ranges from about 40 Torr to about 500 Torr.

Reaction chamber 104 has two additional tubular sections not shown. One of the additional tubular sections projects into the plane of the sectional view in FIG. 1, and the second additional tubular section projects out of the plane of the sectional view in FIG. 1. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of nanoparticles.

Collection system 106 can include a curved channel 250 leading from collection nozzle 230. Because of the buoyant nature of the nanoparticles, the product nanoparticles follow the flow of the gas around curves. Collection system 106 includes a filter 252 within the gas flow to collect the product nanoparticles. A variety of materials such as teflon, glass fibers and the like can be used for the filter as long as the material is inert and has a fine enough mesh to trap the particles. Preferred materials for the filter include, for example, a glass fiber filter from ACE Glass Inc., Vineland, N.J.

Pump 254 is used to maintain collection system 106 at a reduced pressure. A variety of different pumps can be used. Appropriate pumps 254 include, for example, Leybold Model SV300 pump from Leybold Vacuum Products, Export, Pa. with a pumping capacity of about 195 cfm. It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient nanoparticles are collected on filter 252 such that the pump can no longer maintain the desired pressure in the reaction chamber 104 against the resistance through filter 252. When the pressure in reaction chamber 104 can no longer be maintained at the desired value, the reaction is stopped, and the filter 252 is removed. With this embodiment, about 3–75 grams of nanoparticles can be collected in a single run before the chamber pressure can no longer be maintained. A single run generally can last from about 10 minutes to about 3 hours depending on the type of particle being produced and the particular filter.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the bottom of the reaction chamber, and the product particles are collected from the top of the chamber. This alternative configuration tends to result in a slightly higher collection of product since nanoscale particles generally are buoyant in the surrounding gases. In this configuration, it is preferable to include a curved section in the collection system so that the collection filter is not mounted directly above the reaction chamber.

An alternative design of a laser pyrolysis apparatus has been described. See, commonly assigned, copending U.S. patent application Ser. No. 08/808,850, entitled "Efficient Production of Particles by Chemical Reaction," incorporated herein by reference. This alternative design is intended to facilitate production of commercial quantities of nanoparticles. A variety of configurations are described for injecting the reactant materials into the reaction chamber.

The alternative apparatus includes a reaction chamber designed to minimize contamination of the walls of the chamber with particles, to increase the production capacity and to make efficient use of resources. To accomplish these objectives, the reaction chamber conforms generally to the shape of an elongated reactant inlet, decreasing the dead volume outside of the molecular stream. Gases can accumulate in the dead volume, increasing the amount of wasted radiation through scattering or absorption by nonreacting molecules. Also, due to reduced gas flow in the dead volume, particles can accumulate in the dead volume causing chamber contamination.

The design of the improved reaction chamber 300 is schematically shown in FIGS. 2 and 3. A reactant gas channel 302 is located within block 304. Facets 306 of block 304 form a portion of conduits 308. Another portion of conduits 308 join at edge 310 with an inner surface of main chamber 312. Conduits 308 terminate at shielding gas inlets 314. Block 304 can be repositioned or replaced, depending on the reaction and desired conditions, to vary the relationship between the elongated reactant inlet 316 and shielding gas inlets 314. The shielding gases from shielding gas inlets 314 form blankets around the molecular stream originating from reactant inlet 316.

The dimensions of elongated reactant inlet 316 preferably are designed for high efficiency particle production. Reasonable dimensions for the reactant inlet for the production of iron, iron carbide and iron sulfide particles, when used with a 1800 watt $CO_2$ laser, are from about 5 mm to about 1 meter.

Main chamber 312 conforms generally to the shape of elongated reactant inlet 316. Main chamber 312 includes an outlet 318 along the molecular stream for removal of particulate products, any unreacted gases and inert gases.

Tubular sections 320, 322 extend from the main chamber 312. Tubular sections 320, 322 hold windows 324, 326 to define a laser beam path 328 through the reaction chamber 300. Tubular sections 320, 322 can include shielding gas inlets 330, 332 for the introduction of shielding gas into tubular sections 320, 322.

The improved apparatus includes a collection system to remove the nanoparticles from the molecular stream. The collection system can be designed to collect a large quantity of particles without terminating production or, preferably, to run in continuous production by switching between different particle collectors within the collection system. The collection system can include curved components within the flow path similar to curved portion of the collection system shown in FIG. 1. The configuration of the reactant injection components and the collection system can be reversed such that the particles are collected at the top of the apparatus.

As noted above, properties of the resulting nanoparticles can be modified by further processing. For example, the heating process can be used to increase the uniformity and/or crystallinity of the particles and possibly to remove adsorbed compounds on the particles. The atmosphere surrounding the particles in the oven should be a nonreactive environment. It has been discovered that use of mild conditions, i.e., temperatures well below the melting point of the nanoparticles, can result in modification of crystal structure of particles without significantly sintering the particles into larger particles. This processing in an oven is further discussed in commonly assigned, copending U.S. patent application Ser. No. 08/897,903, entitled "Processing of Vanadium Oxide Particles With Heat," incorporated herein by reference.

Figure 4:
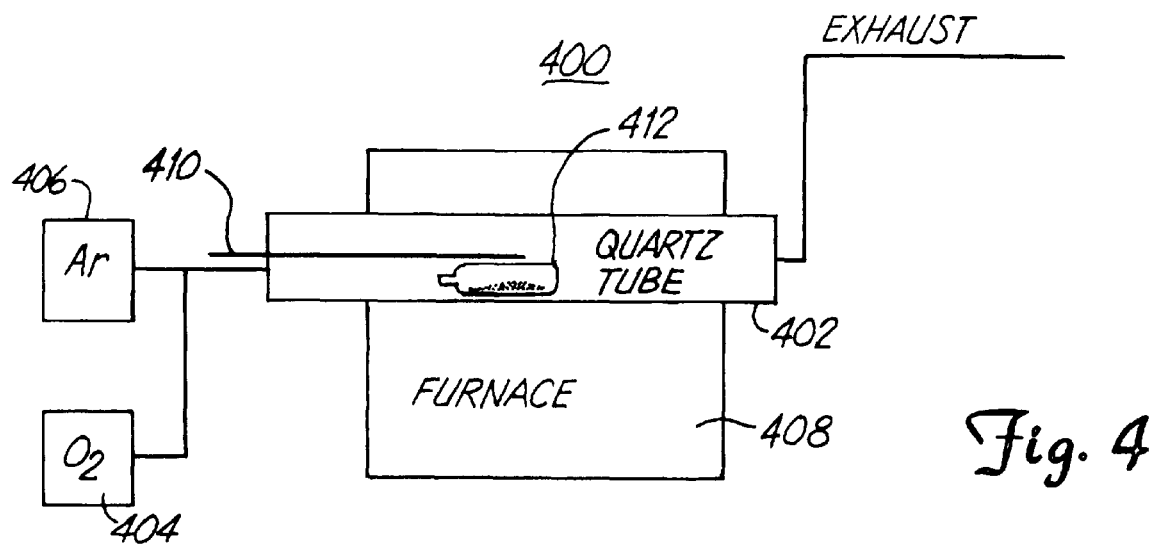
FIG. 4 is a schematic, sectional view of an oven for heating nanoscale particles, in which the section is taken through the center of the quartz tube.

An example of an apparatus 400 to perform this heat processing is displayed in FIG. 4. Apparatus 400 includes a tube 402 into which the nanoparticles are placed. Tube 402 is connected to a nonreactive gas source 404. The nonreactive gas can include one or more compounds to produce the desired atmosphere are placed within tube 402. Preferably, the desired gases are flowed through tube 402. Appropriate nonreactive gases include, for example, $O_2$, $CO_2$, $N_2$, Ar, He, and combinations thereof. The nonreactive gas can be air.

A variety of ovens can be used to perform the heating. One embodiment is depicted in FIG. 4. Tube 402 is located within oven or furnace 408. Oven 408 maintains the relevant portions of the tube at a relatively constant temperature, although the temperature can be varied systematically through the processing step, if desired. Temperature in oven 408 generally is measured with a thermocouple 410.

The particles can be placed in tube 402 within a vial 412. Vial 412 prevents loss of the particles due to gas flow. Vial 412 generally is oriented with the open end directed toward the direction of the source of the gas flow. Alternatively, the particles can be placed within a material that permits gas flow while holding the particles in place. For example, the collection filter from the laser pyrolysis could be placed within tube 402 in an orientation that would tend to keep the particles on the filter material.

The precise conditions including type of nonreactive gas, concentration of nonreactive gas, pressure or flow rate of gas, temperature and processing time can be selected to produce the desired properties of product material. The temperatures generally are mild, i.e., significantly below the melting point of the material. The use of mild conditions avoids interparticle sintering that would result in larger particle sizes. Some controlled sintering of the metal or metal compound particles can be performed in oven 408 at somewhat higher temperatures to produce slightly larger average particle diameters.

For the processing of α-iron, iron carbides and iron sulfides, the temperature preferably ranges from about 50° C. to about 1000° C., more preferably from about 50° C. to about 500° C. The nanoparticles preferably are heated for about 1 hour to about 100 hours. Some empirical adjustment may be required to produce the conditions appropriate for yielding a desired material.

B. Catalyst Particle Properties

A collection of preferred elemental iron, iron carbide or iron sulfide particles generally has an average diameter of less than a micron, preferably from about 5 nm to about 500 nm and more preferably from about 5 nm to about 100 nm, and even more preferably from about 5 nm to about 50 nm. The particles generally have a roughly spherical gross appearance. Upon closer examination, the particles generally have facets corresponding to the underlying crystal lattice. Nevertheless, the particles tend to exhibit growth that is roughly equal in the three physical dimensions to give a gross spherical appearance. Diameter measurements on particles with asymmetries are based on an average of length measurements along the principle axes of the particle. The measurements along the principle axes preferably are each less than about 1 micron for at least about 95 percent of the nanoparticles, and more preferably for at least about 98 percent of the nanoparticles.

Because of their small size, the particles tend to form loose agglomerates due to van der Waals forces between nearby particles. Nevertheless, the nanometer scale of the particles is clearly observable in transmission electron micrographs of the particles. For crystalline particles, the particle size generally corresponds to the crystal size. The particles generally have a surface area corresponding to particles on a nanometer scale as observed in the micrographs. Furthermore, the particles manifest unique properties due to their small size and large surface area per weight of material.

As produced, the particles preferably have a high degree of uniformity in size. As determined from examination of transmission electron micrographs, the particles generally have a distribution in sizes such that at least about 95 percent of the particles have a diameter greater than about 40 percent of the average diameter and less than about 160 percent of the average diameter. Preferably, the nanoparticles have a distribution of diameters such that at least about 95 percent of the particles have a diameter greater than about 60 percent of the average diameter and less than about 140 percent of the average diameter.

Furthermore, substantially no particles have an average diameter greater than about 5 times the average diameter. In other words, the particle size distribution effectively does not have a tail indicative of a small number of particles with significantly larger sizes. This is a result of the small reaction region for laser pyrolysis and corresponding rapid quench of the particles. Preferably, less than about 1 particle in $10^6$ have a diameter greater than about 5 times the average diameter. The narrow size distribution and lack of a tail in the distribution can be exploited for the production of uniform carbon particles and fibers, as described below.

Although under certain conditions, mixed phase material can be formed, laser pyrolysis generally is effective to produce single phase, crystalline particles. Particles produced by laser pyrolysis generally have a very high uniformity with respect to displaying a single crystalline phase and corresponding stoichiometry within the phase. Primary particles generally consist of single crystals of the material. Under certain conditions, amorphous particles are formed by laser pyrolysis. The amorphous particles can be useful for certain applications, and the amorphous particles generally can be heated under mild conditions to form crystalline particles.

Similarly, particles produced by laser pyrolysis generally have been found to have a high degree of crystallinity. Furthermore, the iron, iron carbide and iron sulfide particles produced by the above methods generally have a purity greater than the reactant gases because the crystal formation process tends to exclude contaminants from the lattice. In view of all of these characteristics, especially small particle size, uniformity in size, crystalline phase and purity, the particles described herein are particularly suitable for catalyst applications.

At room temperature, α-iron (body-centered cubic) is the stable phase of elemental iron. α-iron is a ferromagnetic material. At temperatures above about 770° C., β-iron is formed. β-iron is paramagnetic and has the same or similar lattice structure as α-iron. At temperatures greater than about 910° C. γ-iron (cubic closed packed) is the stable phase of iron. At temperatures greater than about 1400° C. δ-iron (body-centered cubic) is the stable phase of elemental iron.

Iron is known to exist in several different oxidation states. For example, iron carbides have been observed with stoichiometries of $Fe_3C$ (cementite-orthorhombic), $Fe_7C_3$ (triclinic and hexagonal, pseudohexagonal or orthorhombic), $Fe_5C_2$ (Hagg carbide—monoclinic), $Fe_2C$ (cementite, orthorhombic), $Fe_{20}C_9$, $Fe_4C$ and ε-carbide ($Fe_xC$, $2<x<3$, hexagonal). Iron sulfides can have stoichiometries of FeS (hexagonal, NiAs-like structure) and $FeS_2$ (cubic, NaCl-like structure). In addition, many non-stoichiometric iron sulfides have been observed. The conditions used in laser pyrolysis generally can be altered select the desired forms of the iron compounds. The conditions in a particular apparatus for the selective production of α-Fe, $Fe_3C$ and $Fe_7C_3$, have been described in the Bi et al., J. Material Res. article, supra.

C. Carbon Formation

Carbon particles and filamentous carbon can be produced by pyrolysis of hydrocarbons and other carbon containing molecules. Catalysts provide for the use of lower temperatures to generate the elemental carbon. The properties of the carbon particles or carbon fibers depend on the reaction conditions and the properties of the catalyst particles.

Iron, iron carbide and iron sulfide particles formed by laser pyrolysis are improved catalyst particles for elemental carbon formation. They are particularly improved for carbon fiber formation because of their high levels of uniformity. In particular, the uniformity in size is advantageous for the production of carbon fibers and carbon particles that are more uniform.

Suitable carbon reactants include, for example, carbon monoxide; aromatic hydrocarbons such as benzene, toluene, xylene, cumene, ethylbenzene, naphthalene, phenanthrene, anthracene, and mixtures thereof; and nonaromatic hydrocarbons such as methane, ethane, propane, ethylene, propylene, acetylene and mixtures thereof. Suitable hydrocarbons can also contain oxygen, nitrogen, fluorine, phosphorous, sulfur, chlorine, bromine and the like. Examples of oxygen containing hydrocarbons include, for example, alcohols such as methanol and ethanol, ketones such as acetone, aldehydes such as formaldehyde and acetaldehyde, and mixtures thereof. The reactant stream can contain inert diluents such as $CO_2$, argon, helium or $N_2$. In addition, the reactant stream can include other reactants such as $H_2$, $H_2S$ and $H_2O$.

As noted above, the catalyst particles can become coated with elemental carbon to form carbon particles. Alternatively or in addition, carbon fibers can be formed. The carbon fibers generally have a length at least about 5 times the diameter of the fiber. Depending on the production conditions, the length of the carbon fibers can be as large as about 100 or more times the fiber diameter. The outer diameter preferably ranges from about 3 nanometer to about 100 nanometers. Evidence suggests that the fiber outer diameters are roughly the size of the catalyst particle diameter that provide the catalytic site for the fiber formation. The carbon fibers created with the preferred catalysts preferably have a narrow distribution of fiber diameters reflecting the narrow distribution of catalyst diameters.

The carbon fibers preferably have layers of ordered carbon arranged around an inner core region. The ordered carbon layers preferably have graphitic domains oriented with their c-axes substantially perpendicular to the cylindrical axis of the fibers. The fibers are generally cylindrical in a broad sense of having a roughly circular cross section along its length, but the fibers generally are curved about their central axis. The fibers, as produced, may be associated with the catalyst particles. If desired, the catalyst particles can be removed by treatment with aqueous hydrochloric acid or other suitable composition that does not disrupt the carbon component.

U.S. Pat. No. 5,165,909, (the '909 patent) entitled "Carbon Fibrils and Method for Producing Same," incorporated herein by reference, describes an approach for producing carbon fibrils (i.e., fibers) that are graphitic in nature without having an overcoat of pyrolytic carbon on the outside of the fibers. Depending to some degree on catalyst pretreatment, the process described in the '909 patent results in carbon coated catalyst particles and/or carbon fibers. For the reasons discussed above, the present catalyst particles would provide improved results in the process described in the '909 patent. Pretreatment can be effective to activate the particles for catalytic activity. Pretreatment can involve heating the particles in an activating atmosphere just prior to contacting the catalyst with carbon precursor. For a particular catalyst, the reaction conditions and pretreatments suitable for obtaining particular reaction products can be determined empirically based on the general description herein.

The reactant stream with carbon precursor can be mixed with the catalyst and flowed through a heated reaction chamber. The reaction chamber is heated generally to a temperature from about 650° C. to about 1300° C. The temperature should be selected to be high enough for the catalytic production of elemental carbon, but low enough such that significant amounts of thermal carbon are not produced. If the carbon precursors are thermally unstable, the catalyst particles can be heated to a higher temperature than the carbon precursor prior to contacting the carbon precursor with the catalyst particles.

A variety of additional reaction parameters are significant including, for example, catalyst composition, catalyst pre-reaction treatment, precursor temperature, chamber pressure, flow rate, growth time and reactant stream composition. The reaction parameters generally are interdependent. Suitable reaction conditions generally depend on the configuration of the particular apparatus. See the '909 patent for a description of suitable reaction conditions when using a particular apparatus with different types of catalyst particles. Straightforward empirical adjustments can be performed with a particular apparatus.

The catalyst particles are contacted with a stream of the carbon precursor for a suitable period of time to produce the desired carbon particles or fibers. A suitable period of time can range from about 10 seconds to about several hundred minutes depending on the conditions. Generally, the weight ratio of carbon precursor to catalyst is at least 100:1, and preferably at least about 1000:1.

In a preferred embodiment, the carbon fibers are produced in a continuous process. For continuous production, the carbon precursors and/or the catalysts are heated to the same or different temperatures. The heated carbon precursors and catalysts are combined in a reaction chamber. The combined catalysts and precursors flow through the reaction chamber, which generally is heated to a suitable temperature for carbon fiber growth. Product fibers and catalyst can be removed from the flow using a filter at the end of the reaction chamber or outside of the reaction chamber. Unreacted carbon precursor can be recycled through the reaction chamber. If desired, the catalyst and carbon precursors can be mixed prior to heating. A variety of structures and configurations of the reaction chamber can be used based on these general criteria. One suitable reaction chamber design is shown schematically in FIG. 6 the '909 patent.

In alternative embodiments, the catalyst particles are not flowed through the reaction chamber. The catalyst particles are contained in a reaction zone, and the carbon precursor is flowed through the reaction zone. The catalyst particles can form a packed bed or a fluidized bed such that the carbon precursor flows over or through the bed of catalyst particles, respectively. The catalyst can be removed continuously while carbon precursor continues to flow, or completely when carbon fiber production is terminated. Again, a variety of designs can be used for the apparatus with the packed bed or fluid bed of catalyst particles.

In one embodiment, the apparatus in FIG. 4 can be adapted for the production of carbon particles and/or carbon fibers. The catalyst particles are placed in a vial or on a filter within the tube located in the oven. The carbon precursor along with other reactant gases or inert gases are flowed through the tube. The oven is set to the desired temperature for the reaction. The carbon particles are recovered from the vial or filter.

The embodiments described above are intended to be representative and not limiting. Additional embodiments of the invention are within the claims. As will be understood by those skilled in the art, many changes in the methods and apparatus described above may be made by the skilled practitioner without departing from the spirit and scope of the invention, which should be limited only as set forward in the claims which follow.

What is claimed is:

1. A method of producing elemental carbon comprising combining catalyst particles with a carbon precursor gas within a heated reaction chamber, the catalyst particles comprising elemental iron, iron carbide, or iron sulfide and having an average diameter from about 5 nm to about 1000 nm with a distribution of diameters such that at least about 95 percent of the particles have a diameter greater than about 60 percent of the average diameter and less than about 140 percent of the average particle diameter, and wherein the catalyst particles are produced by laser pyrolysis.

2. The method of claim 1 wherein the catalyst particles have an average diameter less than about 500 nm.

3. The method of claim 1 wherein the catalyst particles have an average diameter less than about 100 nm.

4. The method of claim 1 wherein the catalyst particles comprise iron sulfide.

5. The method of claim 1 wherein the catalyst particles have substantially no particles with a diameter greater than about 1 micron.

6. The method of claim 1 wherein the catalyst particles and carbon precursor gas are heated to a temperature from about 650° C. to about 1300° C.

7. The method of claim 1 wherein the elemental carbon is produced in a continuous process.

8. The method of claim 7 wherein the catalyst particles flow through the reaction chamber during the continuous process.

9. A method of producing elemental carbon comprising combining catalyst particles with a carbon precursor gas within a heated reaction chamber, the catalyst particles comprising elemental iron, iron carbide, or iron sulfide and having an average diameter from about 5 nm to about 1000 nm with substantially no particles with a diameter greater than about 1 micron, and wherein the catalyst particles are produced by laser pyrolysis.

10. The method of claim 9 wherein the catalyst particles have an average diameter less than about 500 nm.

11. The method of claim 9 wherein the catalyst particles have an average diameter less than about 100 nm.

12. The method of claim 9 wherein the catalyst particles comprise iron sulfide.

13. The method of claim 9 wherein the catalyst particles and carbon precursor gas are heated to a temperature from about 650° C. to about 1300° C.

14. The method of claim 9 wherein the catalyst particles are single phase crystalline particles.

15. The method of claim 1 wherein the catalyst particles are single phase crystalline particles.

16. A method of producing carbon fibers comprising contacting catalyst particles with a carbon precursor gas, the catalyst particles comprising elemental iron, iron carbide or iron sulfide and having an average diameter from about 5 nm to about 1000 nm, the catalyst particles having been produced by laser pyrolysis.

17. The method of claim 16 wherein the catalyst particles have an average diameter less than about 100 nm.

18. A method of producing elemental carbon comprising contacting catalyst particles with a carbon precursor gas, the catalyst particles comprising iron sulfide and having an average diameter from about 5 nm to about 1000 nm.

19. The method of claim 18 wherein the catalyst particles have an average diameter less than about 100 nm.

20. The method of claim 18 wherein the catalyst particles have a distribution of diameters such that at least about 95 percent of the particles have a diameter greater than about 60 percent of the average diameter and less than about 140 percent of the average particle diameter.

* * * * *

UNITED STATES PATENT AND TRADEMARK OFFICE
CERTIFICATE OF CORRECTION

PATENT NO. : 6,045,769
DATED : April 4, 2000
INVENTOR(S) : Kambe et al.

It is certified that error appears in the above-identified patent and that said Letters Patent is hereby corrected as shown below:

On the title page:

Under [57] Abstract:
Line 8, after "size" insert --such--.

Signed and Sealed this

Twentieth Day of February, 2001

Attest:

NICHOLAS P. GODICI

Attesting Officer

Acting Director of the United States Patent and Trademark Office